(12) United States Patent
Chen et al.

(10) Patent No.: US 7,954,899 B2
(45) Date of Patent: Jun. 7, 2011

(54) SEAT BACK ASSEMBLY WITH AN ADJUSTABLE HEADREST

(75) Inventors: Yi-Ru Chen, Farmington Hills, MI (US); Lindsay Anne-Allor Babian, Canton, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 8 days.

(21) Appl. No.: 12/341,086

(22) Filed: Dec. 22, 2008

(65) Prior Publication Data
US 2010/0156152 A1   Jun. 24, 2010

(51) Int. Cl.
*A47C 7/18* (2006.01)
*A47C 7/38* (2006.01)

(52) U.S. Cl. .............. 297/410; 297/391; 297/452.18; 297/452.48

(58) Field of Classification Search ............ 297/391, 297/410, 452.18, 452.48
See application file for complete search history.

(56) References Cited

U.S. PATENT DOCUMENTS

| | | | |
|---|---|---|---|
| 3,511,535 A | 5/1970 | Gunlock | |
| 4,109,959 A | 8/1978 | Barecki et al. | |
| 4,350,390 A * | 9/1982 | Ogawa | 297/452.18 |
| 4,568,124 A | 2/1986 | Kanai et al. | |
| 5,468,053 A | 11/1995 | Thompson et al. | |
| 5,542,747 A | 8/1996 | Burchi | |
| 5,676,423 A | 10/1997 | Pedronno et al. | |
| 5,713,634 A * | 2/1998 | Koike | 297/391 X |
| 5,786,394 A | 7/1998 | Slaven | |
| 5,816,658 A * | 10/1998 | Wallis | 297/410 |
| 5,895,094 A * | 4/1999 | Mori et al. | 297/410 |
| 5,951,110 A | 9/1999 | Conner et al. | |
| 5,988,757 A | 11/1999 | Vishey et al. | |
| 6,003,937 A | 12/1999 | Dutton et al. | |
| 6,027,171 A * | 2/2000 | Partington et al. | 297/452.18 |
| 6,059,369 A * | 5/2000 | Bateson et al. | 297/452.18 |
| 6,213,557 B1 | 4/2001 | Aebischer et al. | |
| 6,224,158 B1 * | 5/2001 | Hann | 297/391 |
| 6,409,269 B1 | 6/2002 | Aebischer et al. | |
| 6,491,346 B1 | 12/2002 | Gupta et al. | |
| 6,688,700 B2 * | 2/2004 | Gupta et al. | 297/452.18 |
| 6,733,064 B2 | 5/2004 | Fox et al. | |
| 6,739,673 B2 * | 5/2004 | Gupta et al. | 297/452.65 |
| 6,789,850 B1 * | 9/2004 | Hann | 297/391 |
| 6,811,221 B2 * | 11/2004 | Demianenko et al. | 297/391 |
| 6,948,773 B2 * | 9/2005 | Yetukuri et al. | 297/410 |
| 6,997,515 B2 * | 2/2006 | Gupta et al. | 297/452.18 |
| 7,137,670 B2 * | 11/2006 | Gupta et al. | 297/452.18 X |
| 7,290,837 B2 | 11/2007 | Sugiyama et al. | |
| 7,422,289 B2 * | 9/2008 | Kim et al. | 297/452.18 |
| 7,731,293 B1 * | 6/2010 | Donovan et al. | 297/452.18 |

(Continued)

*Primary Examiner* — Rodney B White
(74) *Attorney, Agent, or Firm* — Gifford, Krass, Sprinkle, Anderson & Citkowski, P.C.

(57) ABSTRACT

A seat back assembly including a frame molded from material having low density such as expanded polypropylene. The seat back assembly further includes an adjustable head rest assembly including a guide bracket encapsulated in a frame. Encapsulating the guide bracket within the frame provides the headrest assembly with a rigid support, while simultaneously reducing the mass of the seat back assembly with respect to seat back assemblies having a metal seat frame. The headrest assembly includes a headrest body and a pair of legs extending outwardly from the headrests. The guide bracket is fully encapsulated within the frame during the molding process, and is configured so as to slidingly receive each of the legs and secure the headrest assembly to the seat back assembly.

7 Claims, 4 Drawing Sheets

U.S. PATENT DOCUMENTS

| | | |
|---|---|---|
| 2003/0116993 A1 | 6/2003 | Skarb et al. |
| 2004/0084937 A1 | 5/2004 | Berta |
| 2005/0146190 A1 | 7/2005 | Taatjes |
| 2005/0168041 A1* | 8/2005 | Glance et al. ............ 297/452.18 |
| 2005/0173903 A1 | 8/2005 | Mellor |
| 2005/0179299 A1* | 8/2005 | Yetukuri et al. .............. 297/391 |
| 2007/0176480 A1* | 8/2007 | Brunner .................. 297/452.18 |
| 2008/0001456 A1* | 1/2008 | Muller et al. ............. 297/410 X |
| 2008/0018162 A1 | 1/2008 | Galbreath et al. |
| 2008/0042482 A1* | 2/2008 | Weiss et al. .......... 297/452.18 X |
| 2008/0048479 A1* | 2/2008 | Yoshida et al. ................ 297/410 |
| 2008/0100116 A1* | 5/2008 | Orzelski ....................... 297/391 |
| 2008/0136240 A1* | 6/2008 | Matthews et al. .... 297/452.18 X |
| 2008/0145635 A1 | 6/2008 | Stoll et al. |
| 2009/0058166 A1* | 3/2009 | Boes ........................ 297/452.18 |
| 2009/0267400 A1* | 10/2009 | Orzelski ....................... 297/391 |
| 2010/0156162 A1* | 6/2010 | Sweers et al. ........ 297/452.18 X |
| 2010/0156163 A1* | 6/2010 | Daisuke et al. ...... 297/452.18 X |

* cited by examiner

SEAT BACK ASSEMBLY WITH AN ADJUSTABLE HEADREST

FIELD OF THE INVENTION

The present invention relates to a seat back assembly having an adjustable headrest, the seat back assembly is formed of low density material such as expanded polypropylene (EPP), and a guide bracket encapsulated within the EPP.

BACKGROUND OF THE INVENTION

Mass reduction in vehicle parts and components lowers the rate of the vehicle's fuel consumption. Thus different materials are considered to form vehicle structure which may be lighter in weight than steel or metal, but yet provide the sufficient structural strength for body support. In particular, it is known to replace metal frames for vehicle components such as seat assemblies with polyurethane, or polypropylene.

Polypropylene has sufficient compression and tensile strength to replace the metal in the manufacture of the seat back assembly frame. Indeed, some vehicle seat backs have done so. Expanded polypropylene (EPP) is generally polypropylene that has been expanded using gas injection during the molding process. EPP has a lower density than polypropylene and thus weighs less than the same volume of polypropylene. Accordingly, it remains desirable to reduce the mass of a seat back assembly by using a frame than is lighter than metal, but yet has sufficient structural integrity so as to withstand the load associated with vehicle operation.

Another design consideration for seat back assemblies is providing comfort to the user. For instance, it is known to provide seat back assemblies with adjustable headrests to accommodate occupants of different sizes. However such headrests require sufficient support along the base of the headrest so as to remain rigidly fixed to the seat back assembly. Thus, it is known to fixed adjustable headrests to a metal seat frame. The metal seat frame has a higher density relative to material such as polypropylene. Thus a vehicle with seat back assembly having a metal frame is heavier and consumes more fuel compared to that same vehicle with a seat back assembly having a frame made of polypropylene. Accordingly, it also remains desirable to have a relatively light weight seat back assembly with an adjustable head rest that is rigidly supported.

SUMMARY OF THE INVENTION AND ADVANTAGES

A seat back assembly with an adjustable head rest assembly including a guide bracket encapsulated in a frame formed of a low density material such as EPP is provided. Encapsulating the guide bracket within the frame provides the headrest assembly with a rigid support, while simultaneously obviating the mass associated with the metal seat frames of the prior art. The headrest assembly includes a headrest body and a pair of legs extending outwardly from the headrests. The guide bracket is fully encapsulated within the frame during the molding process, and is configured so as to slidingly receive each of the legs and secure the headrest assembly to the seat back assembly.

BRIEF DESCRIPTION OF THE DRAWINGS

Other advantages of the present invention will be readily appreciated, as the same becomes better understood by reference to the following detailed description when considered in connection with the accompanying drawings wherein.

DETAILED DESCRIPTION OF THE INVENTION

Figure 1:
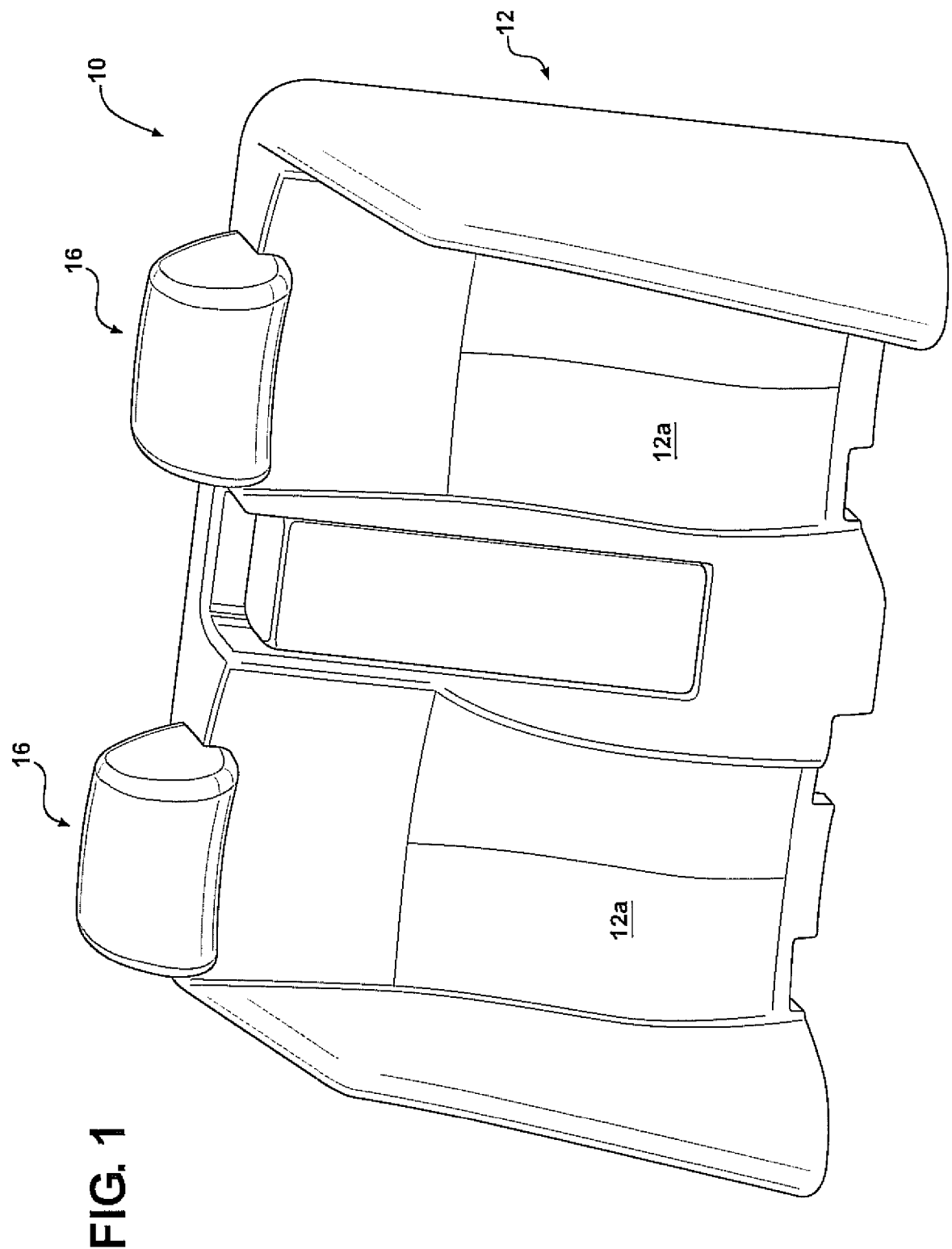
FIG. 1 is a view of the seat back assembly according to an embodiment of the present invention, the seat back assembly includes an the adjustable headrest assembly slidingly mounted thereon.

Referring to the figures, wherein like numerals indicate corresponding parts throughout the several views, a seat back assembly 10 with an adjustable head rest assembly is provided. The seat back assembly 10 includes a frameless seat back 12 having a body 12a made entirely of low density material such as expanded polypropylene. For illustrative purposes, the seat back assembly 10 will be described as having a body formed of expanded polypropylene frame 12. However, it is anticipated that the frameless seat back 12 may be made of other low density materials such as expanded polyethylene or polyurethane. The frameless seat back 12 provides a low density alternative to seat backs having metal seat frames 12. A guide bracket 14 is encapsulated within the frameless seat back 12 so as to provide structural support for the headrest assembly 16.

Figure 4:
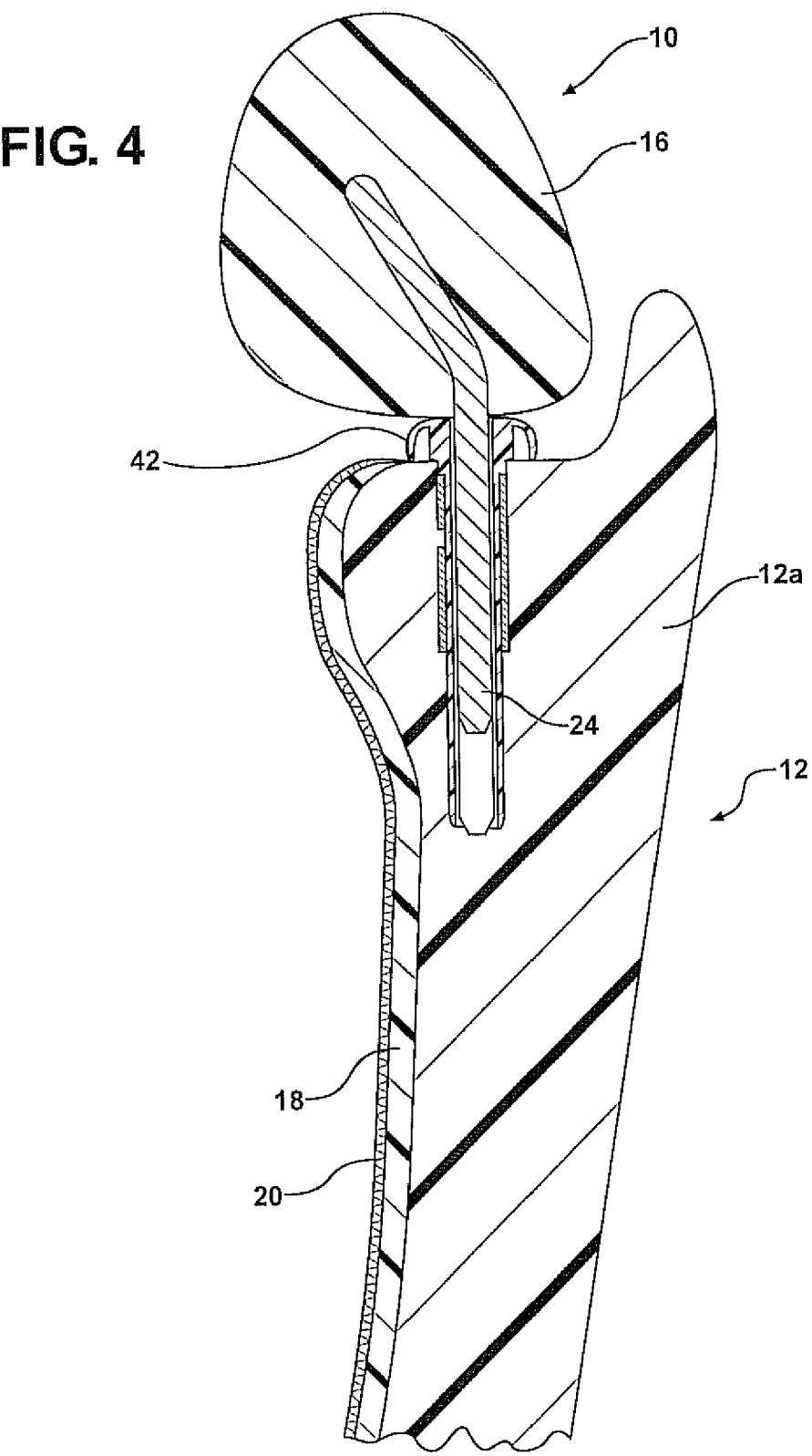
FIG. 4 is a cross-section of FIG. 1 taken along lines 4-4.

With reference now to FIG. 1, a view of the assembled seat back assembly 10 is provided. The seat back assembly 10 may include other features for occupant comfort such as a cushion body 18 or trim cover 20. The cushion body 18 is laid on top of the frameless seat back 12 and covered with the trim cover 20. A cross sectional view of an assembled frameless seat back 12 is provided in FIG. 4.

The frameless seat back 12 provides structural support for the cushion body 18, and occupant load. The cushion body 18 may be made of foam currently used in the art. The cushion body 18 provides comfort to the occupant. The trim cover 20 provides a nice feel for the occupant and may be constructed from leather, synthetic leather, polyester, and the like.

Figure 2:
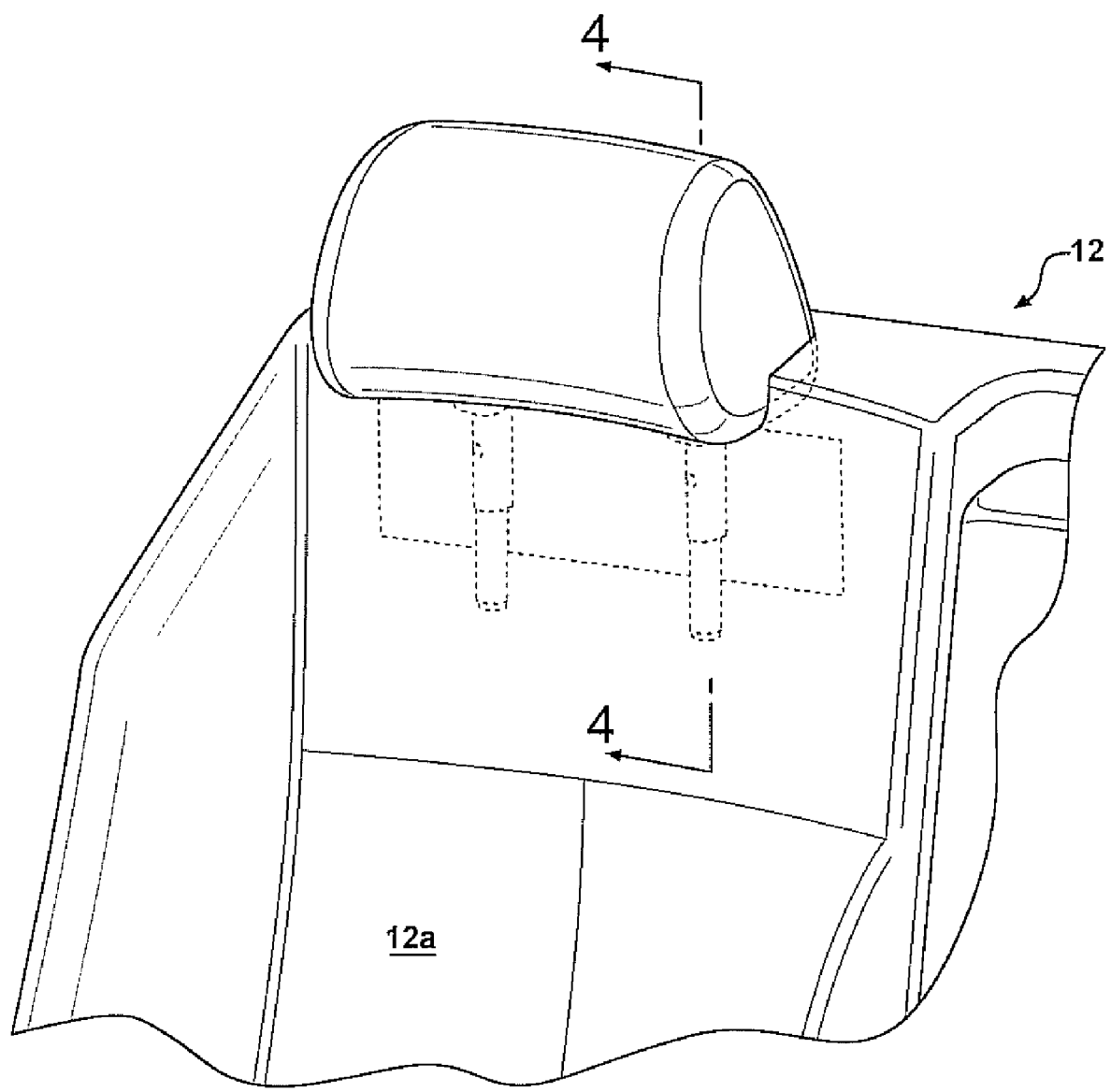
FIG. 2 is perspective showing the guide bracket encapsulated within the frame.

A headrest assembly 16 is mounted onto the seat back assembly 10. With reference now to FIG. 2, the headrest assembly 16 is mounted onto a guide bracket 14 that is encapsulated within the low density body 12a of the frameless seat back 12. This may be done during the molding process. Specifically, a mold such as a clamshell mold may be configured so as to position the guide bracket 14 within the mold body. Polypropylene is injected into the mold, and expanded with gas. Thus the expanded polypropylene body 12a of the frameless seat back 12 encapsulates the guide bracket 14.

Figure 3:
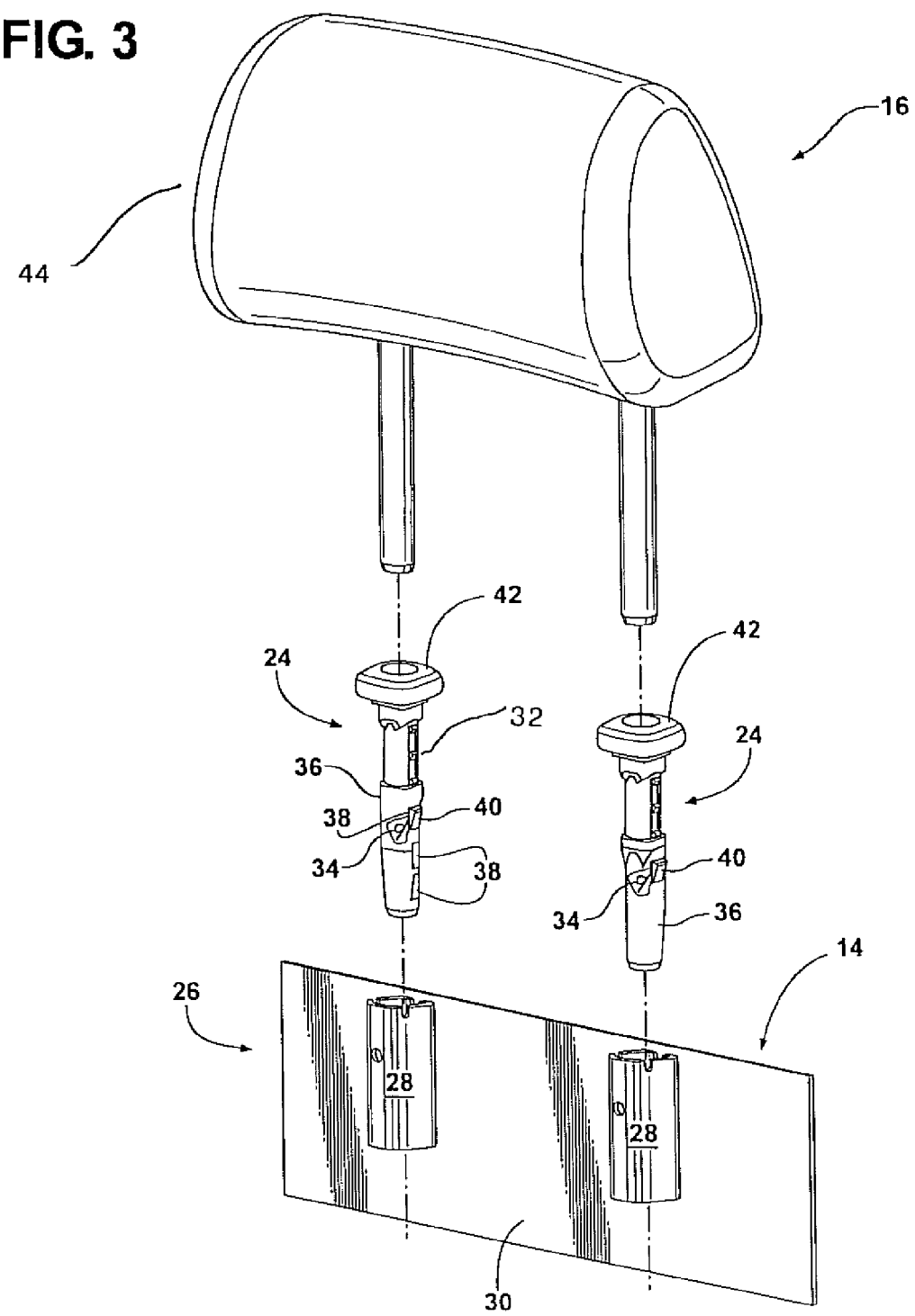
FIG. 3 is an exploded view of the headrest assembly, showing the sleeve, the legs, ramped shaped catches and the slots.

With reference now to FIG. 3, an exploded view of the seat back assembly 10 is provided. The headrest assembly 16 includes a headrest body 44, and a pair of spaced apart legs 24 extending from the headrest body 44. The guide bracket 14 includes a plate 26 having a pair of guides 28. Each guide 28 is configured to receive each leg 24 of the headrest assembly 16. The plate 26 is fully encapsulated within the expanded polypropylene body 12a of the frameless seat back 12, and includes a planar surface 30 so as to help transfer tensile stress into compression. Further, the planar surface 30 transfers load across an enlarged area of the frameless seat back 12. Thus, the planar surface 30 of the plate 26 helps maintain the structural integrity of the frameless seat back 12, while rigidly supporting the headrest assembly 16. The plate 26 may be formed of metal, such as steel, or a hardened polymer.

The headrest is loaded by occupant thus placing the legs 24 into tension. Legs 24 in tension transfers load into guides 28. The guides 28 rigidly mounted to planner surface 30 create a moment about guides 28, thus resulting in plate 26 transforming the moment into compression loading of plate 28 onto expanded polypropylene body 12a of the frameless seat back 12. Thus the expanded polypropylene body 12a of the frameless seat back 12 rigidly supports the headrest assembly 16 without the use of excess and relatively heavy components such as a metal frame. Accordingly, the seat back assembly 10 weighs less than conventional seat back assemblies 10 with headrest assemblies 16 thereby reducing the fuel consumption of the vehicle.

Any adjustable headrest assembly 16 known to those skilled in the art is suitable for use with the guide bracket 14, illustratively including the one shown in the figures. The headrest assembly 16 includes a latching mechanism 32 operable to releasingly engage predetermined portions of the leg 24 so as to displace the headrest body 44 with respect to the frameless seat back 12.

With reference again to FIG. 3, the guide bracket 14 and headrest assembly 16 are shown. The legs 24 of the headrest assembly 16 are identical to each other and include a plurality of ramped shaped catches axially aligned with each other. The ramped shaped catches are biased outwardly by a spring 34. Each ramped shaped catch is spaced apart from the other. Each leg 24 is fitted within an elongated metal sleeve 36. The sleeve 36 includes spaced apart slots 38 axially aligned with each other.

In operation, the legs 24 are mounted within the sleeve 36 and may slide within the sleeve 36 so as to displace the headrest body 44 relative to the frameless seat back 12. The first ramp shaped catch 40 will be urged against the biasing force of the spring 34 until a portion of the ramp shape catch is pushed into the sleeve 36 so as to register the first ramp shaped catch 40 to the first slot 38. The spring 34 urges the ramp shape catch outwardly so as to fittingly engage the slot 38 and fix the body 44 at a predetermined height. The latching mechanism 32 may include a button (not shown) operable to overcome the biasing force of the spring 34 so as to allow the user to slide the headrest body 44 within the sleeve 36 to a desired position. It is anticipated that the guide bracket 14 may further including grommets 42 disposed within each guide 28 so as to prevent the leg 24 of the headrest 22 from rattling within the guide bracket 14.

Obviously, many modifications and variations of the present invention are possible in light of the above teachings and may be practiced otherwise than as specifically described while within the scope of the appended claims.

What is claimed is:

1. A seat back assembly mounted to a vehicle body, the seat back assembly comprising:
    a seat cushion mounted to the vehicle body;
    a frameless seat back having a body formed entirely of expanded polypropylene, the frameless seat back mounted to the seat cushion and spaced apart and free of the vehicle body;
    a headrest assembly having a headrest body and a leg extending outwardly from the headrest body, and a latching mechanism operable to releasingly engage any one of a plurality of predetermined portions of the leg so as to adjust the height of the headrest assembly with respect to the frameless seat back; and
    a guide bracket having a plate, the plate having a planar surface and a guide fixedly and rigidly secured to the plate, the guide configured to receive the leg of the headrest assembly, wherein the guide bracket is encapsulated wholly within the expanded polypropylene body of the frameless seat back, the leg creating a moment about the guide when a load is placed on the headrest body, the plate transforming the moment into compression loading of the plate onto the inner surfaces of the expanded polypropylene body of the frameless seat back so to transfer tensile stress along the expanded polypropylene body of the frameless seat back.

2. A seat back assembly as set forth in claim 1 wherein the guide bracket is formed of metal.

3. A seat back assembly as set forth in claim 1 wherein the headrest assembly further includes a sleeve having a plurality of slots axially aligned along the sleeve, and wherein the leg includes a ramp shaped catch, and wherein the leg is slidingly engaged within the sleeve, and wherein the ramp shaped catch is operable to register with any one of the plurality of slots so as to displace the headrest assembly in one of a predetermined number of positions, and wherein the latching mechanism is operable to disengage the ramp shaped catch from any one of the plurality of slots.

4. A seat back assembly having a cushion body covered with a trim cover, the seat back assembly comprising:
    a frameless seat back having a body formed entirely from low density material, the frameless seat back supporting the cushion body;
    a headrest assembly having a headrest body and a leg extending outwardly from the headrest body, and a latching mechanism operable to releasingly engage any one of a plurality of predetermined portions of the leg so as to adjust the height of the headrest assembly with respect to the frameless seat back; and
    a guide bracket configured to slidingly receive the leg of the headrest assembly, wherein the guide bracket is wholly encapsulated within the frameless seat back, the guide bracket including a plate having a planar surface in contact with an inner surface of the frameless seat back, the leg creating a moment about the guide bracket when a load is placed on the headrest body, the plate transforming the moment into compression loading of the plate onto the inner surface of the frameless seat back so to transfer tensile stress along the frameless seat back.

5. A seat back assembly as set forth in claim 4 wherein the low density body of the frameless seat back material is one selected from the group consisting of expanded polypropylene, expanded polyethylene, and expanded polyurethane.

6. A seat back assembly mounted to a vehicle body, the seat back assembly comprising:
    a seat cushion mounted to the vehicle body;
    a frameless seat back having a body formed entirely of expanded polypropylene, the frameless seat back mounted to the seat cushion and spaced apart and free of the vehicle body;
    a headrest assembly having a headrest body, a sleeve, a leg extending outwardly from the headrest body, and a latching mechanism operable to releasingly engage any one of a plurality of predetermined portions of the leg so as to adjust the height of the headrest assembly with respect to the frameless seat back, the sleeve having a plurality of slots axially aligned along the sleeve, and wherein the leg includes a ramp shaped catch, and the leg is slidingly engaged within the sleeve, and the ramp shaped catch is operable to register with any one of the plurality of slots so as to displace the headrest assembly in one of a predetermined number of positions, and wherein the latching mechanism is operable to disengage the ramp shaped catch from any one of the plurality of slots; and a guide bracket having a plate, the plate having a planar surface and a guide fixedly and rigidly secured to the plate, the guide configured to receive the leg of the headrest assembly, wherein the guide bracket is encapsulated wholly within the expanded polypropylene body of the frameless seat back, the leg creating a moment about the guide when a load is placed on the headrest body, the plate transforming the moment into compression loading of the plate onto the inner surfaces of the expanded polypropylene body of the frameless seat back so to transfer tensile stress along the expanded polypropylene body of the frameless seat back.

7. A seat back assembly as set forth in claim 1 wherein the headrest assembly further includes a sleeve having a plurality of slots axially aligned along the sleeve, and wherein the leg includes a ramp shaped catch, and wherein the leg is slidingly engaged within the sleeve, and wherein the ramp shaped catch is operable to register with any one of the plurality of slots so as to displace the headrest assembly in one of a predetermined number of positions, and wherein the latching mechanism is operable to disengage the ramp shaped catch from any one of the plurality of slots.

\* \* \* \* \*